United States Patent
Shen et al.

(10) Patent No.: US 10,137,846 B2
(45) Date of Patent: Nov. 27, 2018

(54) CONNECTOR USED FOR CONNECTING VEHICLE PARTS AND A VEHICLE EMPLOYING THE SAME

(71) Applicant: Ford Global Technologies, LLC, Dearborn, MI (US)

(72) Inventors: Kevin Shen, Nanjing (CN); Xuezhi Jin, Nanjing (CN); Mark Drewe, Nordrhein-Westfalen (DE); Wilfried Goex, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 15/376,258

(22) Filed: Dec. 12, 2016

(65) Prior Publication Data
US 2017/0210305 A1 Jul. 27, 2017

(30) Foreign Application Priority Data
Jan. 26, 2016 (CN) ..................... 2016 2 0077757 U

(51) Int. Cl.
*B60R 13/02* (2006.01)
(52) U.S. Cl.
CPC ...... *B60R 13/0206* (2013.01); *B60R 13/0212* (2013.01)

(58) Field of Classification Search
CPC . B60R 13/02; B60R 13/0206; B60R 13/0212; B60R 13/0225
USPC .................................................. 296/1.08, 214
See application file for complete search history.

(56) References Cited

U.S. PATENT DOCUMENTS

| | | | |
|---|---|---|---|
| 6,120,090 A | 9/2000 | Van Ert et al. | |
| 7,677,653 B2 | 3/2010 | Brown et al. | |
| 8,046,880 B2 * | 11/2011 | Katoh | F16B 5/0628 24/297 |
| 8,398,161 B2 | 3/2013 | Kirchen et al. | |
| 8,511,631 B2 * | 8/2013 | Kato | B60R 13/0206 24/297 |
| 8,876,200 B2 | 11/2014 | Huelke et al. | |
| 8,899,671 B2 | 12/2014 | Huelke | |
| 2009/0188086 A1 * | 7/2009 | Okada | B60R 13/0206 24/297 |

FOREIGN PATENT DOCUMENTS

JP 2014024526 A * 2/2014 ......... B60R 13/0206

* cited by examiner

*Primary Examiner* — Jason S Daniels
(74) *Attorney, Agent, or Firm* — Alice Xu; Mohr IP Law Solutions, PC

(57) ABSTRACT

A connector used in a vehicle part comprises a base plate connected with the vehicle part; and a clip housing disposed on the base plate and forming a receiving space with the vehicle part. The base plate includes a reinforcement portion disposed in the receiving space.

17 Claims, 2 Drawing Sheets

CONNECTOR USED FOR CONNECTING VEHICLE PARTS AND A VEHICLE EMPLOYING THE SAME

RELATED APPLICATION

This application claims the benefit of Chinese Patent Application No.: CN 201620077757.5 filed on Jan. 26, 2016, the entire contents thereof being incorporated herein by reference.

FIELD

The present application relates to automotive field, in particular, relates a connector used to connect components in a vehicle.

BACKGROUND

In automobile field, vehicle components such as a headliner is usually attached to a vehicle frame by connectors. With the current technologies, a clip housing of the connector is usually attached to the vehicle parts using adhesives. However, the adhesive connection may not be secured, and thus may cause the vehicle part to be detached. To solve this issue, an improved current technology integrates the clip housing into the vehicle parts via molding process.

This molding technique, however, has drawbacks as well. Due to upward pushing effect of thermal stress in the molding process, the area of the vehicle part covered by the clip housing would be protruded toward the inner portion of the clip housing causes in a recess on a surface toward the passenger, and thus affects the quality in appearance of the vehicle part, which would result in complaint from customers and results in an issue on the vehicle's quality.

SUMMARY

To deal with the issues in the related techniques, the present disclosure provides a connector to prevent undesired recess on the vehicle parts.

According to one aspect the present disclosure provides a connector for a vehicle cart comprising a base plate connected with the vehicle part, and a clip housing disposed on the base plate to form a receiving space between the vehicle parts. The base plate includes a reinforcement portion extending to the receiving space and contacting the vehicle parts.

In one embodiment, the reinforcement portion includes a neck portion and a head portion that extend into the receiving space from a main portion of the base plate. A width of the head portion is greater than a width of the neck portion.

In another embodiment the reinforcement portion includes a reinforcement rib extended from the main portion of the base plate to the head portion.

In another embodiment, an end of the reinforcement portion that is on the main portion is configured to have a sloped shape.

In another embodiment, a top surface of the reinforcement portion is spaced apart from an inner side surface of a top all of the clip housing.

In another embodiment, the reinforcement portion covers 20 about % to about 100% of area of the vehicle part exposed in the receiving space.

In another embodiment, the top wall of the clip housing includes a clip receiving slot. A projection of the clip receiving slot on the base plate covers a projection of the enforcement portion on the base plate.

In another embodiment, the clip housing and base plate are molded with the vehicle parts integrally as one piece.

According to another aspect, a connector for a vehicle part is provided. The connector comprises a base plate connected with the vehicle part; and a clip housing disposed on the base plate. The clip housing and a surface of the vehicle part define a receiving space to receive a clip. The base plate includes a main portion and a reinforcement portion disposed in the receiving space.

In one embodiment, the clip housing includes a top wall and a sidewall, and the sidewall defines a region on the vehicle part, and an area of the reinforcement portion is about 20% to about 100%, of an area of the region.

In another embodiment, the reinforcement portion includes a head portion, a neck portion between the head portion and the main portion of the base plate, and a reinforcement rib disposed on a top surface of the reinforcement portion and extending along an entire length of the reinforcement portion and partially on the main portion.

In another embodiment, one end of the reinforcement rib has a sloped surface.

In another embodiment, the clip housing, the base plate and the vehicle part are integrally formed in a molding process.

According to yet another aspect, a vehicle, comprises a headliner; and a connector including: a base plate having a main portion and a reinforcement portion, and a clip housing disposed on the base plate. The connector is attached to a surface of the headliner to form a receiving space defined the clip housing and the surface of the headliner, and the reinforcement portion of the base plate is disposed in the receiving space.

In another embodiment, the reinforcement portion includes a head portion and a neck portion between the head portion and the main portion of the base plate.

In another embodiment, the reinforcement portion further includes a reinforcement rib disposed on a middle portion of the reinforcement portion and extended from the main portion to the head portion.

In another embodiment, one end of the reinforcement rib disposed on the main body has a sloped surface.

In another embodiment, the headliner and the connector are integrally formed.

The connectors according to the present disclosure have various advantages. For example, the connector of the present disclosure includes a reinforcement portion disposed in a receiving space formed by a clip housing and the vehicle part, and contacts the vehicle part. In the process of molding the clip housing with vehicle part, the reinforcement portion produces a reversed push pressure against the thermal stress, which offsets the thermal stress and prevents sink mark at a surface of vehicle part resulted from the thermal stress. Therefore, quality of the vehicle part appearance can be improved.

DETAILED DESCRIPTION

The disclosed connector used n a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of the connectors for a vehicle are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
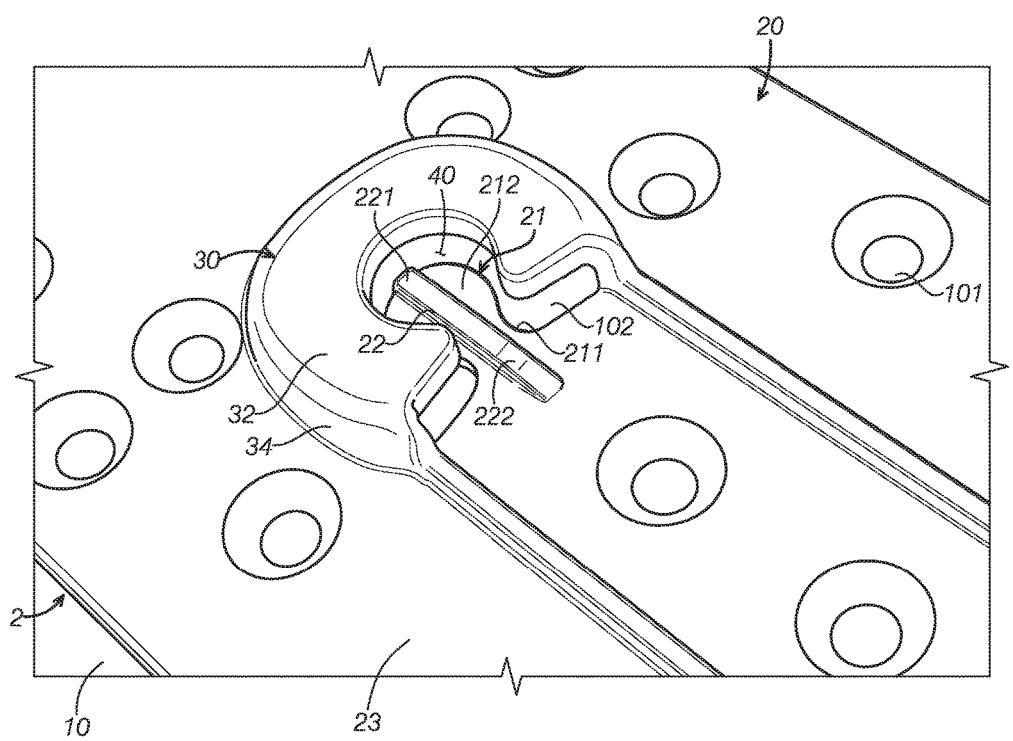
FIG. 1 is a perspective view of an embodiment of connector according to the present disclosure.

FIG. 1 schematically illustrates a perspective view of a connector 2 according to one example embodiment of the present disclosure. In some embodiments, the connector 2 may be used in a vehicle to connect two vehicle parts. The connector 2 is attached to a vehicle part 10. In some embodiments, the part 10 may be a headliner to be connected to an upper sheet metal of the vehicle. The connector 2 may be attached on a surface of the headliner 10 facing the sheet metal. During the assembling, a clip may be coupled to the connector 2 and thus the headliner 10 may be connected to the sheet metal by snap fit the clip in the connector 10 with an aperture in the upper sheet metal configured to receive the clip. Alternatively, or additionally, the headliner may be further connected to the sheet metal via adhesive material. In the depicted embodiment, a plurality of holes may be formed on the connector to contain the adhesive material such as glue.

Figure 2:
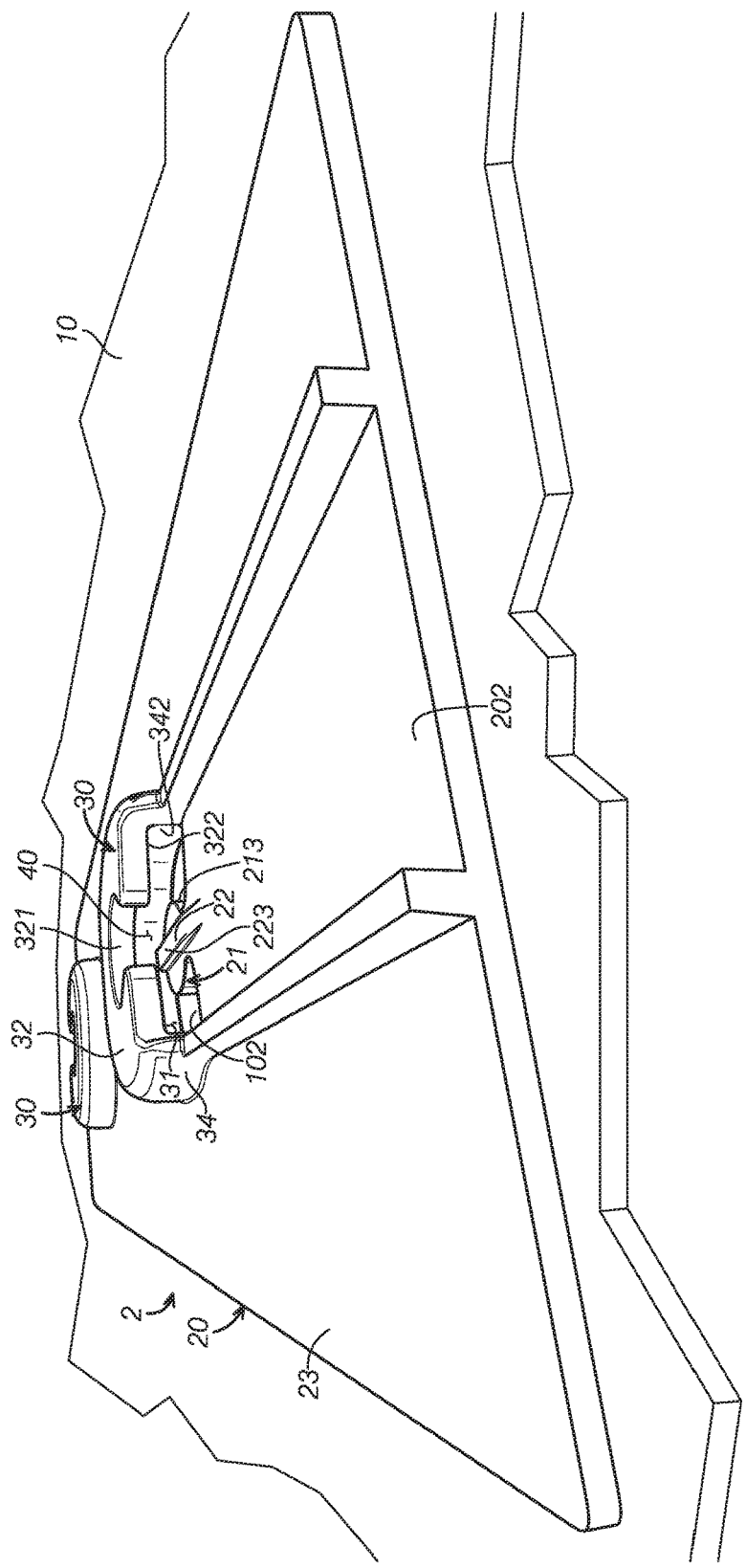
FIG. 2 is a perspective view of the connector in FIG. 1 from another view angle.

Now referring to FIGS. 1 and 2, the connector 2 may include a base plate 20 and a clip housing 30 disposed on the base plate 20. The clip housing 30 may include a top wall 32 having a clip receiving slot 321 and a side wall 34 having an opening 31 toward a side 202 of the base plate 20. The clip housing 30 and a surface of the vehicle part 10 define a receiving space 40. A clip (not shown) may be slid into clipping house 30 via the opening 31. An inner surface 342 of the sidewall 34 defines a region 102 inside the clipping housing 30 on the vehicle part 10. The base plate 20 includes a reinforcement portion 21 and a main portion 23. The main portion 23 may be defined as a portion of the base plate that s outside the region 102. The reinforcement portion 21 extends into the receiving space 40 and contacts the vehicle part 10. In other words, the reinforcement portion 21 is disposed inside the clipping housing 30 or on the region 102. In some embodiments, the connector 2 may be integrally formed with the vehicle part 10 via an injection molding. During the process of molding the connector and the vehicle part 10, reinforcement portion 21 produces a force opposite to a thermal stress, so that the thermal stress is offset to prevent sink mark on the surface of vehicle part 10 and thus improve the appearance of the vehicle part 10 (e.g., the headliner).

The reinforcement portion 21 may have any suitable configuration that generates a force to offset the thermal stress and facilitate the tooling and operation in the molding process. For example, in some embodiments, the reinforcement portion 21 includes a neck portion 211 and a head portion 212, which extend from the main portion 23 into the receiving space 40 sequentially. That is, the head portion 212 may be substantially disposed in the receiving space 40. In some embodiments, the neck portion 211 is at least partially or entirely disposed in the receiving space 40. A width of the head portion 212 is greater than a width of the neck portion 211. The width refers to the dimension in a direction that is substantially perpendicular to a movement of a clip into the clip housing 30 and parallel to a plane in which the base plate 20 is located. In some embodiments, the head portion 212 may have a circular shape. With the circular head portion 212 and the neck portion 211 narrower than the head portion 212, the area of the reinforcement portion 21 in the receiving space 40 is increased, and thus the appearance of the shrank mark on the vehicle part 10 is prevented. Further, the configuration of the neck portion 211 may enable easy pulling out of the tool in the injection molding.

Continuing, with FIG. 1 and with reference to FIG. 2, the reinforcement portion 21 includes a reinforcement rib 22 extended from a main portion 23 of the base plate 20 to the head portion 212 of the reinforcement portion 21. The reinforcement rib 22 is disposed on a surface of the reinforcement portion 21 that s away from the vehicle part 10, and the reinforcement rib 22 extends from the main portion 23 across the neck portion 211 to the head portion 212 to enhance strengthen on the neck portion 211. Further, in some embodiments, a first end 221 of the reinforcement rib 22 extends into the receiving space 40 along with the reinforcement portion 21, and a second end 222 of the reinforcement rib 22 opposite to the first end (i.e., the end on the main portion 23 of the base plate 20) remains at outside of the receiving space 40. The reinforcement rib 22 is preferably formed integrally with the reinforcement portion 21, or fixed together with the reinforcement portion using other conventional techniques to enhance strength on reinforcement portion 21 and therefore further increase the force of the reinforcement portion 21 to the vehicle part 10. In this way, the thermal stress on the vehicle part 10 can be offset or minimized and prevent the appearance of sink mark on the vehicle part 10 during the molding process.

Continuing with FIGS. 1-2, the reinforcement rib 22 may be configured to have an elongated shape, and at least part of the reinforcement rib 22 is disposed in the receiving space 40. For example, the reinforcement rib 22 passes an opening 31 of the clip housing 30. In some embodiments, the reinforcement rib 22 may be disposed in a middle portion of the reinforcement portion 21. A portion of the reinforcement rib 22 including the first end 221 is disposed in the receiving space 40, and the second end 222 remains at outside of the receiving space 40. In some embodiments, a clip may be assembled into the connector 2 via the opening 31 and along a length of the reinforcement rib 22. The second end 222 is configured to have a sloped shape, which facilitates the passing of a clip going through the opening 31 and into a clip receiving slot 321 because the sloped surface favors the sliding of the clip, and does not generate much resistance to the sliding of the clip compared to the structure having a stepped shape. Such configuration beneficial to the assembling of the clip with the clip housing.

The reinforcement portion 21 may cover about 20% to about 100% of the area that the vehicle part 10 is exposed on the receiving space 40. In other words, an area of the reinforcement portion 21 is about 20% to about 100% of an area of the region 102. In some embodiments, an outer sidewall 213 of the reinforcement portion 21 may be spaced apart from a profile of a projection of the clip receiving slot 321 on the headliner, in other words, the projection of the enforcement portion 21 on the vehicle part 10 is within a range of projection of the clip receiving slot 321 on the vehicle part 10.

Preferably, the area of the vehicle part 10 being covered by the reinforcement portion 21 may be about 30, 50, 70, or 90%. The increased area covered by the reinforcement portion can increase the offset effect of the reinforcement portion 21 to the thermal stress on vehicle part, and thus preventing the appearance of sink mark effectively.

Referring to FIG. 2, the clip housing 30 includes the opening 31 for the clip (not shown) to enter the clip housing and the clip receiving slot 321, in the depicted embodiment, the clip receiving slot 321 is defined by a substantially circular inner wall on the top wall 32. In one embodiment, a projection of the clip receiving slot 321 on a plane of the base plate 20 covers a projection of the enforcement portion 21 on the plane of the base plate 20. That is, the projection of the enforcement portion 21 on the base plate 20 is within a range of projection of the clip receiving slot 321 on the base plate 20. In such configuration, the upper and lower molding tools can be pulled out directly from the clip housing 30 upon completion of molding process, without lateral sliding movement and thus facilitating the removal of the molding tools.

Continuing with FIG. 2, a top surface 223 of the reinforcement rib 22 is spaced away from an inner surface 322 of the top wall 32 of the clip housing 30. The spaced apart configuration forms a room between the reinforcement rib 22 and the top wall 32 so that a portion of the clip can enter the receiving space 40 to enable the assembling of the clip into the clip housing 30.

Continuing with FIGS. 1-2, in some embodiments, the clip housing 30 and the base plate 20 are molded with the vehicle part 10 as one piece. With the integral piece, the clipping housing 30 and the base plate 20 can be prevented to be detached from the vehicle part 10. Further the appearance of sink mark can be prevented due to the presence of the enforcement portion 21.

In some embodiments, the clip housing 30 and the base plate 20 may be attached together by adhesive connection. The presence of the enforcement portion 21 20 can increase the adhesive area between the connector and vehicle parts 10 and thus increase the adhesive strength, to prevent detachment of the connector.

The connector 2 may include at least one clip housing. FIG. 2 shows that the connector 2 comprises two clipping housings. A plurality of the clip housing in the connector can provide a plurality of clipping points to connect one vehicle cart (e.g., headliner) with another vehicle part (e.g., the sheet metal).

According to another aspect of the present disclosure a vehicle is provided to include the connector as described above, the vehicle part 10 is a headliner of the vehicle. With the connector including the enforcement portion 21 and the reinforcement rib 22, the appearance of sink mark on the headliner of vehicle during the molding process can be minimized or prevented to ensure the quality on the appearance of the headliner.

According to another aspect, a vehicle comprises a headliner and a connector including: a base plate having a main portion and a reinforcement portion, and a clip housing connected to the base plate. The base plate is connected to a surface of the headliner to form a receiving space defined by the clip housing and the surface of the headliner, and the reinforcement portion of the base plate is disposed in the receiving space. In some embodiments, the headliner and the connector are integrally formed in a molding process. In some embodiments, the reinforcement portion may further include a reinforcement rib disposed on a middle portion of the reinforcement portion and extended from the main body to the head portion.

The disclosure above encompasses multiple distinct inventions with independent utility. While each of these inventions has been disclosed in a particular form, the specific embodiments disclosed and illustrated above are not to be considered in a limiting sense as numerous variations possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A connector used in a vehicle part, comprising:
a base plate connected with the vehicle part; and
a clip housing disposed on the base plate and forming a receiving space with the vehicle part,
wherein the base plate includes a reinforcement portion, and wherein the reinforcement portion is disposed in the receiving space and contacts the vehicle part,
wherein the reinforcement portion includes a neck portion and a head portion that extend into the receiving space sequentially from a main portion of the base plate, and
wherein a width of the head portion is greater than a width of the neck portion.

2. The connector of claim 1, wherein the reinforcement portion includes a reinforcement rib extending from the main portion of the base plate to the head portion.

3. The connector of claim 2, wherein an end of the reinforcement portion disposed on the main portion of the base plate has a sloped shape.

4. The connector of claim 2, wherein a top surface of the reinforcement rib is spaced apart from an inner surface of the top wall of the clip housing.

5. The connector of claim 1, wherein the reinforcement portion covers about 20% to about 100% of an area of the vehicle part exposed in the receiving space.

6. The connector of claim 1, wherein a top wall of the clip housing includes a clip receiving slot, and wherein a projection of the clip receiving slot covers a projection of the reinforcement portion on the base plate.

7. The connector of claim 1, wherein the clip housing, the base plate and the vehicle part are integrally formed via a molding process.

8. A connector for a vehicle part, comprising:
a base plate connected with the vehicle part; and a clip housing disposed on the base plate, wherein the clip housing includes a top wall and a sidewall that define a receiving space to receive a clip, wherein the base plate includes a main portion and a reinforcement portion disposed in the receiving space, and wherein the reinforcement portion includes a head portion, and a neck portion between the head portion and the main portion of the base plate.

9. The connector of claim 8, wherein the sidewall of the clip housing defines a region on the vehicle part, and an area of the reinforcement portion is about 20% to about 100% of an area of the region.

10. The connector of claim 8, wherein a reinforcement rib is disposed on a top surface of the reinforcement portion and extending along an entire length of the reinforcement portion and partially on the main portion.

11. The connector of claim 10, wherein one end of the reinforcement rib has a sloped surface.

12. The connector of claim 11, wherein the clip housing and the base plate part are integrally formed with the vehicle part in a molding process.

13. A vehicle, comprising:
a headliner; and
a connector including: a base plate having a main portion and a reinforcement portion, and a clip housing including a top wall having a clip receiving slot and a sidewall having an opening toward one side of the base plate, wherein the connector is attached to a surface of the headliner to form a receiving space, and the reinforcement portion of the base plate is disposed in the receiving space, wherein the side wall of the clip housing defines a region on the headliner and an area of the reinforcement portion is less than an area of the region, and wherein an outer sidewall of the reinforcement portion is spaced apart from a profile of a projection of the clip receiving slot on the headliner.

14. The vehicle of claim 13, wherein the reinforcement portion includes a head portion and a neck portion between the head portion and the main portion of the base plate.

15. The vehicle of claim 13, wherein the reinforcement portion further includes a reinforcement rib disposed on a middle portion of the reinforcement portion and extended from the main portion to the head portion.

16. The vehicle of claim 14, wherein one end of the reinforcement rib disposed on the main portion has a sloped surface.

17. The vehicle of claim 13, wherein the headliner and the connector are integrally formed.

* * * * *